United States Patent
Hundley, Jr. et al.

(10) Patent No.: US 10,414,923 B2
(45) Date of Patent: Sep. 17, 2019

(54) LIQUID COATING FOR ROOFING SYSTEM FIBERBOARD AND PROCESSES FOR MAKING AND USING THE SAME

(71) Applicant: Blue Ridge Fiberboard, Inc., Hampshire, IL (US)

(72) Inventors: Joseph W. Hundley, Jr., Martinsville, VA (US); Thomas S. Verrill, Danville, VA (US); Larry E. Dooley, Danville, VA (US); Mark Custer, Danville, VA (US)

(73) Assignee: Blue Ridge Fiberboard, Inc., Hampshire, IL (US)

(*) Notice: Subject to any disclaimer, the term of this patent is extended or adjusted under 35 U.S.C. 154(b) by 603 days.

(21) Appl. No.: 14/962,112

(22) Filed: Dec. 8, 2015

(65) Prior Publication Data
US 2016/0185976 A1  Jun. 30, 2016

Related U.S. Application Data

(63) Continuation of application No. 14/297,881, filed on Jun. 6, 2014.

(60) Provisional application No. 61/833,000, filed on Jun. 10, 2013, provisional application No. 61/833,210, filed on Jun. 10, 2013.

(51) Int. Cl.
| | |
|---|---|
| *D21J 1/08* | (2006.01) |
| *C09D 5/33* | (2006.01) |
| *B27N 7/00* | (2006.01) |
| *C09D 5/32* | (2006.01) |
| *C09D 7/61* | (2018.01) |
| *C08K 3/22* | (2006.01) |

(52) U.S. Cl.
CPC ............ *C09D 5/004* (2013.01); *B27N 7/005* (2013.01); *C09D 5/32* (2013.01); *C09D 7/61* (2018.01); *D21J 1/08* (2013.01); *C08K 3/22* (2013.01); *Y10T 428/31989* (2015.04)

(58) Field of Classification Search
CPC ............ B05D 2203/02; B05D 2203/20; B05D 2203/22; D21H 23/26; D21H 23/28
See application file for complete search history.

(56) References Cited

U.S. PATENT DOCUMENTS

| | | | |
|---|---|---|---|
| 3,779,860 A * | 12/1973 | Oshida ............... | C04B 26/26 162/129 |
| 4,376,674 A * | 3/1983 | Ali .................. | D21H 5/0002 106/18.12 |
| 4,906,484 A * | 3/1990 | Lambuth ............ | C08K 3/04 156/62.2 |
| 4,916,014 A | 4/1990 | Weber et al. | |
| 5,609,788 A | 3/1997 | Deetz | |
| 7,815,772 B2 | 10/2010 | Malik | |
| 8,038,845 B2 | 10/2011 | Malik | |
| 8,057,638 B2 | 11/2011 | Malik | |
| 8,241,463 B2 | 8/2012 | Malik | |
| 8,382,951 B2 | 2/2013 | Malik | |
| 8,382,952 B2 | 2/2013 | Malik | |
| 8,382,953 B2 | 2/2013 | Malik | |
| 2004/0036197 A1 * | 2/2004 | Janiga ............... | B27N 7/00 264/322 |
| 2007/0116732 A1 | 5/2007 | Goebel et al. | |
| 2014/0363691 A1 * | 12/2014 | Hundley, Jr. ....... | C09D 5/004 428/537.1 |

FOREIGN PATENT DOCUMENTS

| | | |
|---|---|---|
| EP | 2525011 A1 | 11/2012 |
| WO | 2013029252 A1 | 3/2013 |

OTHER PUBLICATIONS

EESR in European Appl No. 14811284.0, dated Feb. 2, 2017.

* cited by examiner

*Primary Examiner* — Nathan H Empie
(74) *Attorney, Agent, or Firm* — McAndrews, Held & Malloy, Ltd.

(57) ABSTRACT

Coatings, coating compositions and coating suspensions that contain solar reflective and/or shielding components for use in coating substrates such as cellulosic fiberboard construction materials. The coatings may vary in color from pink to red or from yellow to orange depending on which colorant or solar reflective pigment is used or combinations of colorants and solar reflective pigments is used. Methods of making and using the coatings and coating compositions/ suspensions are also provided.

12 Claims, No Drawings

LIQUID COATING FOR ROOFING SYSTEM FIBERBOARD AND PROCESSES FOR MAKING AND USING THE SAME

RELATED APPLICATIONS

This application is a continuation of and claims priority to and benefit of U.S. application Ser. No. 14/297,881 having a filing date of Jun. 6, 2014, which is incorporated herein by reference in its entirety. This application also claims priority to and benefit of U.S. Application No. 61/833,000 having a filing date of Jun. 10, 2013, which is incorporated herein by reference in its entirety. This application also claims priority to and benefit of U.S. Application No. 61/833,210 having a filing date of Jun. 10, 2013, which is incorporated herein by reference in its entirety.

BACKGROUND OF THE INVENTION

The present disclosure and claims, in general, relate to a liquid coating, coating material or suspension for application to at least one cellulosic fiberboard, fiberboard material, roofing board, roofing board material or other suitable construction material meeting, for example, and preferably ASTM standard C208 for roof system applications. Fiberboard meeting ASTM C208 generally has a coating applied to at least one side of board. The coating is particularly important to certain roofing systems, such as systems that have a membrane (e.g., thermoplastic polyolefin (T.P.O.), polyvinyl chloride vinyl (P.V.C.), ethylene propylene diene monomer (E.P.D.M.) single-ply and/or multi-ply and any other common and uncommon roofing system known to one of skill in the relevant art) attached with an adhesive, such as a liquid adhesive, foam adhesive or peel and stick applications. Solvent and water based adhesives are suitable examples of adhesives that may be used in conjunction with the coatings of the present technology and have demonstrated a unique ability to bond successfully without the poor membrane adhesion commonly associated with asphaltic coated fiberboard.

To attach a membrane, for example a single-ply or multi-ply membrane(s), an adhesive is applied to the surface of the board before applying a membrane. Without a coating, the adhesive can soak or strike into the fiberboard too deeply which can, in turn, result in a weak bond or the need to increase the application rate and/or the amount of adhesive applied. The liquid fiberboard coating is particularly important when certain adhesives, such as water based adhesives, are used because these adhesives exhibit an increased propensity to soak or strike into the fiberboard.

Asphalt based coatings for fiberboard became widespread prior to the use of membranes, such as single-ply or multi-ply membrane(s), in conjunction with the roofing fiberboards. This may have led to the general idea that roofing board is expected to be black in color and to the idea that the black color of a roofing board was accepted to indicate a quality product. However, asphalt based coatings are not generally recommended to be used for fiberboards that include a membrane, such as T.P.O., P.V.C. or EPDM single-ply or multi-ply membrane system(s). This is due to the fact that asphalt based coatings result in poor membrane adhesion and/or degradation of membrane. Therefore, there was a need in the art for non-asphalt based liquid coatings for roofing fiberboards that are used in conjunction with membranes.

Generally, non-asphalt based liquid coatings for roofing system fiberboards that include attached membranes have utilized carbon black as a colorant. This is likely a result of the previous general acceptance of idea that the black color indicated a quality product. However, the use of carbon black in current roofing fiberboard coatings is detrimental because the carbon black absorbs solar energy and, thereby, could contribute to curling of the fiberboard. Curling of the fiberboard is particularly problematic with roofing fiberboards because it can cause irregularities that interfere with the application of the membrane to the fiberboard. Therefore, the instant Applicants recognized that there is a current need in the art to replace carbon black as the pigment in non-asphalt based roofing fiberboard coatings in order to produce a higher quality non-asphalt coating that is compatible for use with adhesive applied membranes and that inhibits moisture loss and curling.

The instant Applicants have also discovered that replacing carbon black with a solar reflecting pigment or additive will reduce curling which will improve application of membrane. The first objective of the current technology, in certain embodiments, is to provide a coating with a color other than black. This non-black color feature is advantageous because it will facilitate recognition of the fiberboards coated with certain embodiments of the present technology and distinguish fiberboards coated with the present coatings from asphalt coated fiberboards. This will enable membrane installers to be confident that they are affixing membranes to the appropriate fiberboards that contain a non-asphalt based coating. Red iron oxide, yellow iron oxide and titanium dioxide are very effective in reducing solar heat gain. Coatings made with these solar reflectors have a color range of pink to red and yellow to orange. These coating colors allow for easy recognition that the coatings are asphalt free. The inclusion of thermal insulating particles in coatings has some impact on the color of the coating. In general these thermal insulating particles reduce the intensity of the coating color without interfering with the solar reflectance. Red and Yellow iron oxide are effective as solar reflectors. While titanium dioxide is very effective in reflecting solar energy, the lower cost coating made with yellow or red iron oxide or combinations of the two oxides are effective. Titanium dioxide may be added as a component of this solar reflective coating, but its use may be limited due to the cost of titanium dioxide.

The second separate objective of the present technology is to decrease the curling rate of a fiberboard that is exposed to direct solar light. This curling results when heat causes moisture to evaporate or move away from an exposed surface. Sealing the fiberboard surface with a clear sealer known to prevent moisture transfer does not stop curling. However, sealing the fiberboard with a particular embodiment of the present technology was found to provide advantages with respect to moisture transfer and/or loss and decreased curling. Metal flakes or insulating particles coated with reflective metal is also effective at reducing solar heat gain and curl.

One aspect of the present technology is a fiberboard meeting ASTM standard C208 or similar fiberboard comprising: at least one fiberboard; a sufficient amount of at least one reflective and/or shielding coating capable of reducing moisture loss and curl of the fiberboard or reduced energy transfer though board when the fiberboard is exposed to solar energy; a reflective and/or shielding agent selected from the group consisting of red iron oxide, yellow iron oxide, magnetic iron oxide, titanium dioxide, and combinations thereof; wherein the coated fiberboard contains at least 0.5 pounds of reflective and/or shielding agent per thousand square feet of board and enough of a binder or adhesive to attach reflective and/or shielding agent to the surface of fiberboard. For cellulosic roofing and insulation board weighing about 24 pounds per cubic foot, this application rate for a one inch board would be about 0.5 pounds or greater of reflective and/or shielding agent per 83.3 cubic foot or 0.5 pounds per 2000 pounds of fiberboard. As the density of the fiberboard decreases, more reflective and/or shielding agent is used per pound of cellulosic fiberboard. For example, when a one inch fiberboard weighs 12 pounds per cubic foot, the agent would be applied at a rate of 0.5 pounds per 1000 pounds of fiberboard.

It should be appreciated that the coatings of the present technology are compatible with, and can be used in conjunction with, any variety of cellulosic fiberboard known to one of skill in the relevant art. Examples of some relevant fiberboards and processes of making those fiberboards can be found, for example, in U.S. Pat. Nos. 7,815,772; 8,057,638; 8,038,845; 8,241,463; 8,382,951; 8,382,952 and 8,382,953, the contents of all of which are hereby incorporated by reference in their entireties. A third separate objective with this coating technology is to reduce the quantity of adhesive needed to attach the membrane to the fiberboard.

BRIEF SUMMARY OF THE INVENTION

In some aspects, the present technology, in general, involves coatings, coating compositions and coating suspensions for use in coating cellulosic fiberboard construction materials. The coating color will vary from pink to red and from yellow to orange depending on which colorant or solar reflective pigment is used or combinations of colorants and solar reflective pigments is used. These coating colors will distinguish this coated fiberboard from asphalt coated fiberboard.

More specifically, the present technology involves one or more liquid composition coatings and/or coating suspensions for application to a cellulosic fiberboard construction substrate such as one or more fibrous materials. A preferred fibrous material would be a cellulosic fiberboard. In some embodiments of the present technology, the coating composition may contain, for example by weight:

| Water | 45-99.2% |
|---|---|
| Thermal insulating particles | 0-20% |
| Solar reflective or shielding particles | 0-20% |
| Suspending agent or binder | 0.3-15% | wherein at least 0.5% of the coating comprises thermal insulating particles and/or solar reflective particles. The coating can be applied to fiberboard mat with a moisture content of 35-65%, using spraying, roll coating or curtain coating, or any other method to evenly distribute the coating on to the surface of the fiberboard mat; and drying the fiberboard mat with coating until the moisture content of the fiberboard mat with coating is below 8% total moisture content, thus producing coated fiberboard. The thermal insulating particles are selected from bentonite, kaolin or other clay, mica, insulating zeolite, solid material having insulating properties, hollow spheres of glass-like materials or combinations thereof. The solar reflective particles are selected from red iron oxide, yellow iron oxide, titanium dioxide or other solar reflecting pigment or agent or combinations thereof. The suspending agent and/or binder are selected from bentonite clay, starch, soy adhesive, and polymer binders or combinations thereof.

Another embodiment of the present coating composition is as follows by weight:

| Water | 40-99% |
|---|---|
| Thermal insulating particles | 0-20% |
| Colorant and/or solar reflective or shielding particles | 0.5-40% |
| Binder and or suspending agent or fillers | 0-20% |

The coating can be applied to fiberboard mat or board before drying, during drying or after drying. The application methods include spraying, roll coating, curtain coating, or any other method to evenly distribute the coating on to the surface of the fiberboard or mat. It is also understood that other methods which apply the solar reflective and/or shielding particle separate from the liquid binding system may be used to evenly distribute solar reflective particles; wherein the liquid binder is applied either before and/or after the reflective particles. In this example less liquid may be used.

In other embodiments of the present technology, the coating may contain at least one solar reflective and/or shielding component such as red iron oxide, yellow iron oxide, or titanium dioxide or other pigments which reflect infrared and/or visible light. Barium Lithol or other colorant may be used with solar reflective particles to help achieve a pleasing color. It should be appreciated by those skilled in the art that the present technology encompasses and envisages the usage of any sufficient amount of one or more reflective agents suitable for inclusion in a coating, coating suspension, or other liquid or viscous coating material for later application as a coating to a substrate such as a fiberboard.

In another aspect, the present technology is directed to at least one method of reducing curl and moisture loss from the surface of a substrate such as a fiberboard. In at least one embodiment, the one or more methods involve reduction and/or prevention of curl and/or moisture loss from a construction substrate such as a coated roofing fiberboard material meeting ASTM standard C208.

In one or more embodiments, the method of reducing curl and/or moisture loss from the surface of a substrate such as a fiberboard includes, for example, the steps of (1) providing at least one liquid or viscous coating or suspension containing one or more insulating additives and/or solar reflective additives. One preferred embodiment for the present coating technology is by weight:

| Water | 45-99.2% |
|---|---|
| Thermal insulating additive or particle | 0-20% |
| Solar reflective particles or agent | 0-20% |
| Suspending agent or binder | 0.3-15% | wherein at least 0.5% of the final coating product or end product consists of or employs or contains at least one solar reflective pigment or agent and/or at least one thermal insulating particle. In some embodiments, the method of the present technology may also involve providing at least one construction substrate such as a cellulosic fiberboard mat having, for example, a moisture content of about 35% to about 65%, and subsequently spraying, roll coating or curtain coating (among other application techniques which one of ordinary skill in the art will appreciate can be utilized with the application of the presently described coating/suspension technology) the coating of the present technology onto at least one surface of the construction substrate (e.g., the fiberboard mat). In still further embodiments, the present technology may also involve the step of drying the coated construction substrate (e.g., the fiberboard mat having at least one coating of the present technology applied to at least one side of the fiberboard mat) below about 8% total moisture content in the dried final coated construction substrate product (e.g., the final dried and coated fiberboard mat product).

In additional embodiments, the thermal insulating particles of the present technology may be selected from the group containing, for example, bentonite, kaolin or other clays, mica, insulating glass-like hollow spheres, zeolites or other materials having insulating properties and or combinations of such insulating particles and derivatives thereof.

In other embodiments, the coating or coatings suspensions of the present technology may contain one or more thermal insulating particles that have a variety of particle sizes. For example, such thermal insulating particles may exhibit particle sizes similar to paint grade pigments, paint grade particles and the like. For example, some embodiments of the present technology can employ thermal insulating particles that are nanoparticles. In some preferred embodiments, the make-up of the thermal insulating particles is a majority of such nanoparticles and these thermal insulating particles consisting of a majority of nanoparticles having a mean particle size greater than 0.2 microns. The thermal insulating particles may be particles having a mean particle size below approximately 1000 nm, alternatively below approximately 800 nm, alternatively below approximately 500 nm, and the like. In further embodiments of the present coating or coating suspension technology, such embodiments may contain one or more solar reflective pigments in which at least about 10% of those particles are in the size that reflects the most infrared or visible light. Alternatively, it should be appreciated that in still further embodiments, the solar reflective pigments may be at least about 20%, at least about 30%, at least about 40%, at least about 50% and so on. In some preferred embodiments, the solar reflective pigments have particles in various sizes that reflect the different wave length of infrared or visible light. The solar reflective pigments have particles in various sizes that reflect the different wave length of infrared or visible light, wherein 90%-100% of the particle size varies from nanoparticles to 2300 nm, wherein nanoparticles have a mean particle size greater than 0.2 microns. It should be further appreciated by those skilled in the art that in one or more embodiments of the present technology the thermal insulating particles or the solar reflective pigments be in an amount sufficient to prevent or reduce curling, moisture loss, cupping, or solar energy absorption in, within, or in relation to the final coated construction substrate product (e.g., a final coated fiberboard roofing material).

In some embodiments, the coatings of the present technology may contain one or more solar reflective pigments such as red iron oxide, yellow iron oxide, titanium dioxide or other solar reflecting pigments, dyes, colorants, and the like which reflect some portion of visible and/or infrared light.

In still other embodiments, the present technology may contain at least one suspending agent and/or binder such as bentonite clay, starch, soy adhesive, polymer adhesives, or combinations thereof and derivatives thereof. The use of polymer adhesives that are also film formers should be used in small quantities if the coating is applied before the dryer. The quantity is limited to the amount that does not form a continuous film. A continuous film will blister and interfere with the drying of the board. These film forming polymer adhesives may be used in higher quantities when the fiberboard has been dried or is nearly dried. In certain embodiments of the coatings or coating suspensions of the present technology, the one or more solar reflective agents can be red iron oxide, yellow iron oxide, or titanium dioxide or combinations of solar reflectors.

In some further embodiments, the liquid coatings of the present technology can also contain at least one base that may, for example, be added in order to neutralize any surface acidity, if present on the uncoated fiberboard surface. In certain embodiments of the present technology, the coating may contain at least one base such as magnesium hydroxide, aluminum hydroxide, lime, sodium aluminate or other alkaline chemicals, such as bentonite clay.

Another embodiment of the present coating composition includes magnetic iron oxide which is capable of conducting solar electromagnetic interference or other electromagnetic forces. This coating technology when applied to a fiberboard and incorporated into a complete building package in a manner to completely surround the space to be protected from electromagnetic interference like a Faraday "cage, would protect sensitive electronic equipment from electromagnetic interference or an electromagnetic pulse. An embodiment of this electromagnetic protective coating is as follows by weight:

| | |
|---|---|
| Water or liquid carrier | 40-99.3% |
| Thermal insulating particles | 0-20% |
| Solar reflective or shielding or electromagnetic conductive or reflective particles | 0.4-55% |
| Binder and or suspending agent | 0.1-20% | the coating can be applied to fiberboard mat or board before the dryer, during drying or after drying. The application method includes spraying, roll coating, curtain coating, or any other method to evenly distribute the coating on to the surface of the fiberboard or mat. The coating can help protect electronic equipment from Electromagnetic Interference and can in some embodiments conduct static electricity. In addition to magnetic iron oxide, other magnetic elements or alloys or compounds with iron, nickel, cobalt, gadolinium, neodymium, samarium, chromium, and combinations which are magnetic may be used. Electrically conductive cooper, silver and aluminum as well as other metals and conductive carbon that conduct electricity may be incorporated into coating to lower the OHM resistance, improving electric conductance. Aluminum flake, particles coated with reflective and/or conductive metallic coatings may be used for low cost performance. Some examples of coated particles are clay coated with aluminum, iron, copper and silver. The thickness of the dried fiberboard coating is dependent on component selection and the required conduction requirements. Dried coatings may be as thick as needed to achieve electromagnetic or electrical conductance.

Another embodiment of the present technology provides a substrate coating composition comprising one or more liquid carriers or diluents; optionally, one or more insulating components; one or more solar reflective and/or shielding components; and optionally, one or more fillers.

In certain embodiments the substrate coating compositions of the present technology comprises from about 30% or greater by weight of the one or more liquid carriers or diluents; up to about 20% by weight of the one or more insulating components; up to about 30% by weight of the one or more solar reflective and/or shielding components; and up to about 20% by weight of the one or more fillers.

In some embodiments of the present technology the substrate coating composition comprises water as the liquid carrier or diluent; comprises bentonite, clays, kaolin, mica, insulating zeolites, solid materials having insulating properties, hollow spheres of glass-like material, derivatives thereof, or combinations thereof as the insulating component; comprises red iron oxide, yellow iron oxide, magnetic iron oxide, titanium dioxide, combinations or derivatives thereof as the solar reflective and/or shielding component; and comprises suspending agents, binding agents, derivatives thereof, or combinations thereof as the filler.

In other embodiments of the present technology the filler is a colorant.

In further embodiments of the present technology, the one or more solar reflective and/or shielding components is evenly coated on one side of a substrate at a rate of at least about 0.5 pounds per about 1000 square feet of substrate, at a rate of about 1.3 pounds per about 1000 square feet of substrate, or at a rate of about 2.7 pounds per about 1000 square feet of substrate.

Another embodiment of the present technology provides a substrate coating as part of a coated cellulosic fiberboard meeting ASTM standard C208 or similar comprising at least one fiberboard; a sufficient amount of at least one reflective and/or shielding coating component to reduce moisture loss from the fiberboard or reduce energy transfer though the fiberboard when the fiberboard is exposed to solar energy; and a sufficient amount of a binder or adhesive to attach the reflective and/or shielding component to the surface of the fiberboard.

In certain additional embodiments of the present technology the substrate coating composition further comprises a sufficient amount of one or more electromagnetic components.

In further embodiments of the present technology the one or more electromagnetic components is selected from the group consisting of magnetic iron, and magnetic iron compounds, magnetic alloys, derivatives thereof, and combinations thereof.

In other embodiments of the present technology the one or more electromagnetic components is present in an amount of from about 0.5% by weight to about 30% by weight of the composition, present in an amount of from about 1% by weight to about 5% by weight of the composition, or present in an amount of about 2% by weight of the composition.

In other embodiments, the compositions of the present technology exhibit an attraction to a magnet.

In additional embodiments, compositions of the present technology exhibit an ohm resistance of less than about 19 million at a distance of ½ inch.

In further embodiments, the substrate coating compositions of the present technology can be applied, either wholly or partially, to one or more internal or external surfaces of the substrate.

In particular embodiments of the present technology, the coating compositions can be applied to a fiberboard.

In additional embodiments of the present technology, the coating compositions reduce adhesive and/or binder strike into a substrate such as a fiberboard.

In other embodiments, the substrate coating compositions of the present technology can be applied to a fiberboard to reduce the amount of adhesive needed to attach one or more membranes to the coated fiberboard.

The current technology also provides a coated cellulosic fiberboard material comprising at least one fiberboard and a sufficient amount of at least one solar reflecting or shielding coating capable of having at least one membrane or substrate attached thereto.

Certain coated cellulosic fiberboard materials of the present technology may further comprise at least one colorant and the coating's color wheel spectrum may range from yellow to orange or pink to red.

In other embodiments the coated cellulosic fiberboard materials of the present technology may be coated on more than one side and/or the internal substrate may also be coated.

In further embodiments of the present technology, the coating is applied, either wholly or partially, to one or more internal or external surfaces of a cellulosic fiberboard material.

The present technology also provides a coated cellulosic fiberboard material comprising at least one fiberboard and a sufficient amount of at least one reflective coating capable of preventing or reducing rate of moisture loss from the fiberboard or rate of curl of the fiberboard following its application to at least one surface of the fiberboard.

In addition, the present technology provides a cellulosic fiberboard material comprising at least one cellulosic fiberboard; and a liquid coating comprising: about 40% or greater by weight water; up to about 20% by weight thermal insulating particles; up to 30% by weight one or more solar reflective and/or shielding agents; and up to 15% by weight one or more suspending or binding agent.

Particular embodiments of the present technology are related to cellulosic fiberboards that meet ASTM standard C208 or similar and coatings on and for use with the same.

In other embodiments of the present technology, the solar reflective and/or shielding agents is a solar reflecting pigment or a derivative and/or combination thereof.

In additional embodiments the iron oxides of the present technology are red iron oxides, yellow iron oxides, magnetic iron oxides, barium lithol, derivatives thereof, or combinations thereof.

In additional embodiments of the present technology, the suspending agent or binder is a bentonite, clay, starch, soy adhesive, a polymer binder, derivative thereof, or combination thereof.

In further embodiments, the liquid coatings of the present technology are evenly applied to or evenly distributed upon at least one external or internal surface of a cellulosic fiberboard.

In some embodiments of the present technology, the liquid coatings are evenly applied or evenly distributed to a surface of a cellulosic fiberboard by spraying, roll coating, curtain coating, or any method that evenly applies or distributes the coating to the fiberboard.

The present technology also provides a coating composition comprising at least one liquid carrier; at least one reflective agent; at least one additive; and least one colorant.

Other embodiments of the present technology are related to coating compositions that comprise at least one thinning agent and at least one suspending agent.

The present technology further provides a non-asphaltic coating for a fiberboard material comprising about 30% to about 99% by weight water; optionally, up to about 20% by weight thermal insulating particles; about 1% to about 30% of at least one solar reflective agent or pigment; and up to about 10% of at least one suspending or binding agent.

In additional embodiments the thermal insulating particles of the present technology exhibit a particle size in the range of paint grade pigment particle sizes.

In other embodiments of the present technology, the thermal insulating particles consist of a majority of nanoparticles having a mean particle size of about 0.2 microns or greater.

In further embodiments the thermal insulating particles of the present technology have an average particle size of about 1000 nm or less.

In certain embodiments of the present technology the coatings have a dried thickness of about 1 mil to about 20 mils after being applied to and dried on a substrate, such as a fiberboard.

The present technology also provides a coated cellulosic fiberboard material comprising at least one fiberboard; and a sufficient amount of at least one solar reflective and/or shielding coating capable of shielding or reducing solar energy absorption to, in, into, or within the fiberboard.

The present technology additionally provides a substrate coating composition comprising at least one fiberboard; and a sufficient amount of at least one electromagnetic, magnetic, conductive, or reflective coating capable of being applied to a surface.

Other embodiments of the present technology are related to magnetic coatings that contains sufficient amount of at least one magnetic iron oxide.

In still further embodiments, the coated fiberboards of the present technology reflect or conduct solar electromagnetic interference or electromagnetic pulses such as conducting electromagnetic interference around or away from at least one protective space.

The present technology also provides a liquid coating composition for a cellulosic material comprising about 40% to about 99% by weight of water; up to about 20% by weight of one or more types of thermal insulating particles; up to about 40% by weight of one or more types of electromagnetic or reflective agents optionally containing magnetic iron oxide; and up to 20% by weight of one or more types of suspending or binding agents.

DETAILED DESCRIPTION OF THE INVENTION

The present technology utilizes, in some embodiments, for example, titanium dioxide, in a sufficient amount as the colorant to replace, for example, carbon black, to produce at least one coating for such on a construction substrate (e.g., roofing fiberboard) or other suitable substrates in other industries or applications. In some preferred embodiments of the present technology, such embodiments can include a more cost effective solar heat reflector colorant(s), iron compounds such as red iron oxide or yellow iron oxide in place of carbon black. At least one formula of the coatings of the present technology can be as follows:

| | |
|---|---|
| Water | 84.5-98% |
| Clay or Bentonite Clay | 1-7.75% |
| Colorant or solar reflective pigment | 1-7.75% |

The coatings of the present technology can be produced by adding a sufficient amount of water to a high shear mix tank. Next, the mixer is then turned on and at least one filler material, for example, a clay is added. The clay and water is mixed using the high shear mix tank until few or preferably no lumps remain. Then, at least one colorant is added and the composition is mixed until it is uniform. It should be appreciated by those skilled in the art that a number of different conventional mixing methods can be utilized to make the coating composition of the present technology. It is preferred that such a method utilized provides for few or no lumps and a uniformly mixed coating material/mixture.

The coatings of the present technology can be applied to a number of different substrates such as fiberboard with the use of a roll coater. It should be appreciated by those skilled in the art that a number of conventional application processes and/or devices may be used to apply the one or more coatings or coating suspensions of the present technology to one or more substrates or combinations of substrates. It is preferred that the application method(s) or device(s) uniformly apply the coating and do not remove the coating from the substrate during or after application or subsequent application. Accordingly, it should also be appreciated by those skilled in the art that the viscosity of the coatings or coating suspensions of the present technology is important for the proper application of the coating to a substrate (e.g., application of the coating to a fiberboard using a roll coater or curtain coater, among others). If the viscosity of the coating is too high or too low, the uniformity of application of the coating or coating suspension can be affected, which in turn can affect the improved properties of the final coated end product/substrate (e.g., moisture loss prevention, reflectivity of solar energy, strength, rigidity, adhesion with one or more subsequently applied membranes or membrane materials, among others). Further, if the viscosity of the coating is too low, the coating may soak/strike and/or absorb into the substrate (e.g., fiberboard) and may not provide an adequate coating for a subsequent membrane's application and adhesion. Alternatively, a high viscosity roll coating or coating suspension may pull the surface off of the fiberboard. Thus, in certain embodiments of the present technology the viscosity of the coating may be adjusted using a sufficient amount of at least one or more thickening agents (e.g., clay) to thicken the coating or coating suspension of the present technology. Alternatively, the viscosity of the coating or coating suspension may be reduced utilizing a sufficient amount of water or one or more thinning agents. Low viscosity coatings have a tendency to penetrate surfaces leaving less reflective particles on the surface of the board. A high viscosity coating may not adhere to the surface of the board. The best viscosity range is determined by the board properties at the time of application and the coating method utilized. For example, a coating applied with a roll coater will pull fiber off of the board if the viscosity is too high. A higher moisture content mat usually requires a lower viscosity coating to keep from pulling fiber from the mat. Pulling fiber from the mat compromises the surface quality.

It should be further appreciated by one of skill in the art that any liquid or viscous coating application method, such as spraying, spray coating, atomization, curtain coating, immersion coating, or any other method that evenly distributes the coating on to the fiberboard mat, can be used in conjunction with the coatings or coating suspensions of the present technology. In certain embodiments of the present technology, for instance, a higher solids containing coating may be applied to a roofing fiberboard in order to reduce drying time and/or save energy compared to conventional production methods.

In particular embodiments of the present technology, one or more suspending agents and/or binders, such as bentonite clay, can be utilized. It should also be appreciated that other clays and other binders, such as starch for example, are included in additional embodiments of the present technology. Without being bound by any particular theory, it is believed that the selection of particular clays, binders and/or starches improves, for example, the strength of the coating or coating suspension of the present technology as compared to conventional coated construction substrates (e.g., conventionally coated roofing fiberboard end products).

In additional embodiments, the coatings or coating suspensions of the present technology include one or more natural or synthetic minerals, such as mica and/or Kaolin clay, for example. Again, without being bound by any particular theory, it is believed that the use of mica or materials like Kaolin clay, in some embodiments of the present coating or coating suspension technology, will improve strength, water resistance and/or reduce the transmission of heat due to insulating properties achieved through the inclusion (preferably uniform inclusion) of such materials.

In other embodiments, solar heat reflectors, such as titanium dioxide and iron oxide, for example, are included in the coatings or coating suspensions to reflect solar heat and reduce and/or prevent solar heat absorption. It should also be understood to one of skill in the art that any other pigments and/or additives which reflect solar heat can be included in one or more embodiments of the present coating or coating suspension technology.

In still further embodiments of the present technology, one or more additional inorganic compounds, such as magnesium hydroxide, may be included in the coating or coating suspension in order to neutralize surface pH of the end product or end substrate and to reduce flame spread, for example. Alternatively or additionally, certain embodiments of the present technology may also include a sufficient amount of aluminum hydroxide (or alternatives thereof) to serve as an extender and/or as a flame retardant. For example such aluminum hydroxide may be included, incorporated or mixed with the titanium dioxide or iron oxides to achieve such a desired result.

It should also be understood and appreciated by those skilled in the art that the particle sizes of the pigments and/or solid solar reflectors of the present technology will have a particle size that allows them to function as efficient reflectors of solar heat. Where available, pigments or solid solar reflectors will have a particle size sufficient to reflect a portion, alternatively a significant portion, alternatively a substantial portion, alternatively more than 10%, alternatively more than about 15% to about 95% of solar heat received by the coated end product or substrate, or reduce and/or prevent solar heat absorption in a similar manner. It should be appreciated by those skilled in the art that percentages expressed as about "x"% to about "y"% include incremental increases or decreases from each point of reference (e.g., 0.1%, 1%, 5% and the like type incremental increases or decreases are envisaged as being within the scope of the present technology and claims). In at least one preferred embodiment, the particle size is similar to that of paint grade pigments for ease of dispersion. Without being bound by any particular theory, it is believed that the particle sizes of the one or more reflective pigments are thought to have an influence on reflectance and/or absorbance of solar heat energy and will be selected accordingly for the purposes of the present technology in achieving a coated substrate end product that can reduce or prevent moisture absorption, exhibit reduced or prevented curling and/or cupping, exhibit improved adhesion capabilities with one or more membranes applied thereto, among other improved properties and/or characteristics.

While the coatings of the present technology are applicable to fiberboard roofing systems, for example, it should also be appreciated by those skilled in the art and related arts that certain embodiments of the present technology can be used for other purposes/applications/fields, et cetera. For example, in some embodiments, the coatings of the present technology are used on other fiberboard, fibrous materials, or wood-based products to improve water repellency over current conventional coated substrates, such as carbon black coating on fiberboard, fibrous materials, or wood-based products. Additionally, particular additives are included in other embodiments of the present coatings in order to impart additional desirable features, such as the incorporation of additives to reduce flame spread and incorporation of additives to reflect or conduct solar electromagnetic interference or an electromagnetic pulse so that the coating of the present technology can be used on fiberboards in other building applications beyond roofing. Coatings made with magnetic iron oxide, while remaining black in color exhibit an attraction to magnets. This magnetic property can be used to conduct electromagnetic interference around or away from a protective space. If used with a membrane, magnetic particles may be incorporated into the adhesive that is used to fasten a membrane to a fiberboard. This will help conduct solar electromagnetic interference from board to board. In conducting electromagnetic forces and/or radio frequency, it is important to conduct from fiberboard to fiberboard completely around a protected space. This conductance can be accomplished by single, multipoint and continuous conduction connections. Isolating the protected space from the electrical grid of other sources of electromagnetic forces is important for successful space protection.

In still further embodiments, one or more desired additives may be utilized to produce coated substrates (e.g., fiberboards) that function appropriately in different climate conditions, such as high versus low humidity; high versus low temperature gradients; high versus low load bearing; high versus low moisture; high versus low aridity gradients; high versus low pressure gradients and the like. In additional embodiments, the disclosed coatings may be used to reduce the infrared heat transfer though walls (internal or external) or though roof systems.

One of skill in the relevant building industry art will also appreciate other uses and applications for the coatings or coating suspensions of the present technology.

EXAMPLES

Example 1

Tests were conducted to determine weight loss from one foot squares of fiberboards. Weight loss was measured as it is diagnostic of the amount of moisture that is lost from the fiberboards. Fiberboards coated with four competitor coatings (A, B, C and D), a carbon black coating, and an iron oxide coating of the present technology were tested and compared. The test fiberboards were initially weighed and then placed on a flat surface side by side at 12:00 noon in direct sun. The initial conditions were a temperature of 69.8 degrees Fahrenheit and relative humidity 36.7%. After 50 minutes the air temperature had increased to 76.8 degrees Fahrenheit and the relative humidity decreased to 29.7%. At the end of the 50 minute time period the test was concluded and the fiberboards were weighed once again. The data and calculated weight loss is as follows:

|  | Initial weight | after 50 min. in sun | weight loss % |
| --- | --- | --- | --- |
| Iron oxide coated | 329.5 grams | 324.5 grams | 1.52% |
| Carbon black coated | 327.8 grams | 322.6 grams | 1.59% |
| Competitor coating A | 339.9 grams | 334.5 grams | 1.59% |
| Competitor coating B | 347.0 grams | 341.5 grams | 1.59% |
| Competitor coating C | 275.3 grams | 267.2 grams | 2.15% |
| Competitor coating D | 234.2 grams | 227.4 grams | 2.90% |

The curling was severe in coating C and D with the coating D fiberboard exhibiting the most significant curling. Surprisingly, the fiberboard coated with the iron oxide coating of the present technology exhibited almost no curling at all.

It should be appreciated by those skilled in the art of fiberboard manufacturing that by the very nature of multiple products being created on the same manufacturing line, including but not limited to asphaltic impregnated expansion joint and products with paraffin wax, sporadically all products will contains some degree of asphalt and wax integrally and on the top surface of the board. Accordingly there is potential of reducing the overall life span of single-ply roof membranes when the plasticizers are in direct contact with any asphalt or wax on the surface of the board. Additionally, when attaching a single-ply roof membrane with a low V.O.C. or water based adhesive, any asphalt or wax on the surface of the board has a probability of incompatibility and thus potential for roof membrane bonding failure. The various coatings of the present technology provide adequate separation for the membrane plasticizers and low V.O.C./water based adhesives from any asphalt or wax on the surface of the roofing board. It would be understood that the lowest solids coatings of the present invention would not be as effective a barrier as a similar higher solids coating.

Fiberboard made with the magnetic coating, in addition to being attracted to a magnet, weakly conducted electricity. The initial ohm resistance varied from 19 million ohms to 3 million ohms measured at distance of 0.5 inch. Uncoated fiberboard was not attracted to a magnet and did not conduct electricity. It is understood that the magnetic properties are dependent on the magnetic additives and their concentration in the coating. Some coatings may be both magnetically and electrically conductive while others are principally only magnetic conductive or principally only electrically conductive.

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A method of reducing curl in a coated fiberboard comprising:
   (a) providing at least one liquid coating composition comprising:
      (i) from 0 to 20% by weight of at least one thermal insulating additive;
      (ii) from 0 to 20% by weight of at least one solar reflective agent;
      (iii) from 0.3 to 15% by weight of a suspending agent or binder; and
      (iv) from 45 to 99.2% by weight water,
   provided that the liquid coating composition contains at least 0.5% by weight of (i) and/or (ii),
   wherein the at least one liquid coating composition does not form a continuous film;
   (b) applying the liquid coating composition to at least one surface of a cellulosic fiberboard mat having a moisture content of 35% to 65% at an application rate of at least 0.5 pounds of solar reflective agent per 1000 square feet of fiberboard to 2.7 pounds of solar reflective agent per 1000 square feet of fiberboard; and
   (c) drying the cellulosic fiberboard mat to a total moisture content of less than 8% to produce a dried fiberboard having a coating on the at least one surface;
   wherein the coated fiberboard exhibits less curl compared to a dried fiberboard that does not have the coating when the dried fiberboard is exposed to solar light, and wherein the coated fiberboard meets ASTM standard C208.

2. The method of claim 1, wherein the solar reflective agent is selected from red iron oxide, yellow iron oxide, titanium dioxide, and combinations thereof.

3. The method of claim 1, wherein the thermal insulating additive is selected from bentonite, kaolin, mica, insulating zeolite, hollow spheres of glass-like material, and combinations thereof.

4. The method of claim 1, wherein the suspending agent or binder is selected from bentonite clay, starch, soy adhesive, and combinations thereof.

5. The method of claim 1, wherein the liquid coating composition applied to the fiberboard reduces the amount of adhesive needed to attach one or more membranes to the coated fiberboard.

6. The method of claim 1, wherein the coating composition further comprises one or more electromagnetic components.

7. The method of claim 6, wherein the one or more electromagnetic components is selected from the group consisting of magnetic iron, magnetic iron compounds, magnetic alloys, derivatives thereof, and combinations thereof.

8. The method of claim 6, wherein the one or more electromagnetic components is present in an amount from about 0.5% by weight to about 30% by weight of the composition.

9. The method of claim 6, wherein the one or more electromagnetic components is present in an amount from about 1% by weight to about 5% by weight of the composition.

10. The method of claim 6, wherein the one or more electromagnetic components is present in an amount from about 2% by weight of the composition.

11. The method of claim 6, wherein the coating exhibits an attraction to a magnet.

12. The method of claim 6, wherein the coating exhibits an ohm resistance of less than about 19 million at a distance of ½ inch.

* * * * *